Figure 1:
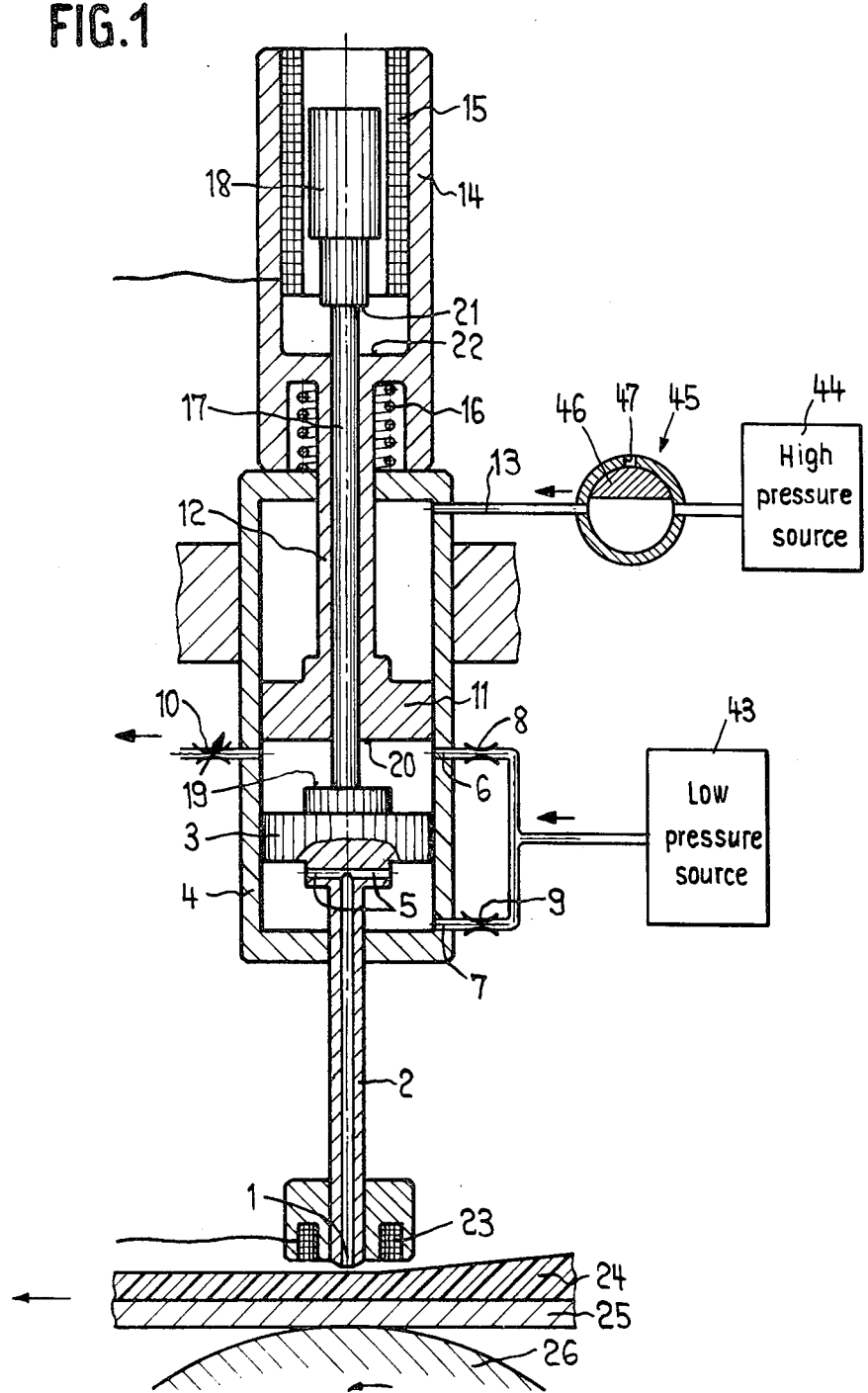

United States Patent [19]
Studer

[11] 3,884,076
[45] May 20, 1975

[54] MEASURING DEVICE

[75] Inventor: Urs Peter Studer, Orpund, Switzerland

[73] Assignee: Zumbach Electronic-Automatic, Orpund, Switzerland

[22] Filed: Dec. 4, 1972

[21] Appl. No.: 312,047

[30] Foreign Application Priority Data
Dec. 7, 1971   Switzerland.................. 17780/71

[52] U.S. Cl............................ 73/37.6; 324/34 TK
[51] Int. Cl. ........................................ G01b 13/04
[58] Field of Search ......... 73/37.5, 37.6, 37.7, 37.8; 324/34 TK

[56] References Cited
UNITED STATES PATENTS

| | | | |
|---|---|---|---|
| 3,194,055 | 7/1965 | Knobel................................. | 73/37.5 |
| 3,472,061 | 10/1969 | Zausznica............................ | 73/37.5 |
| 3,513,555 | 5/1970 | Vachon ....................... | 324/34 TK X |
| 3,610,024 | 10/1971 | Honjo et al.......................... | 73/37.5 |
| 3,617,872 | 11/1971 | Horn et al. .................... | 324/34 TK |

FOREIGN PATENTS OR APPLICATIONS

| | | | |
|---|---|---|---|
| 24,512 | 1/1963 | Germany ............................ | 73/37.5 |
| 238,171 | 2/1969 | U.S.S.R............................... | 73/37.5 |

*Primary Examiner*—Richard C. Queisser
*Assistant Examiner*—Joseph W. Roskos

[57] ABSTRACT

A measuring device incorporating a measuring nozzle through which a pressure medium is conveyed against the surface of an object to be measured, and a piston displaceable in a cylinder connected to the nozzle is controlled by the difference between the pressure acting at the nozzle and a reference pressure. Means are provided for varying the admittance of pressure fluid to inlets of said cylinder for displacing said piston towards the one end of said cylinder and for removing said measuring nozzle from the said object.

8 Claims, 4 Drawing Figures

MEASURING DEVICE

The present invention concerns a measuring device incorporating a measuring nozzle through which a pressure medium is conveyed against a surface of an object to be measured. The nozzle is held at a predetermined distance from the surface of the object to be measured by means of a control piston which is loaded on the measurement nozzle side by the pressure medium feeding said nozzle and, on the opposite side, by a reference pressure.

Measurement devices of this type are used for the measurement of a single workpiece, or for the continuous measurement of a dimension of a product such as a paper web, leaving the production plant. The measuring device may also be used only for keeping another measuring system at a predetermined distance from a workpiece without coming into contact with the workpiece. For example, pneumatic measuring devices may be used to keep measuring coils at a required distance from the surface of a cable as delivered from the production plant without contact with said surface in order to continuously check the thickness of the cable insulation.

In all these and similar cases it is necessary to transfer the measurement nozzle from a resting position into an operating position and conversely. In the measurement of individual workpieces, this will usually be necessary for each individual measurement in order to bring each workpiece to the measuring position. In other cases, as in the above-mentioned measurement of insulating layers on cables, it may be necessary to bring the measurement devices out of their measuring position into a resting position at intervals in order to balance or calibrate the measurement. In the case of other measurements of products, such as stampings, passing through a test point continuously or intermittently, it may be necessary to move into a resting position between each measurement in order to allow projecting parts of the workpieces to pass through below the measurement nozzle.

In order to transfer the measurement nozzle out of its resting position into its operating position and conversely, additional actuating means, such as cylinders or electro-magnets have hitherto been necessary. It is the object of the present invention to avoid these additional actuating means and thus to produce a considerable simplification and more compact construction of measurement devices incorporating a measurement nozzle.

According therefore to the present invention there is provided a measuring device incorporating a measuring nozzle through which a pressure medium is conveyed against the surface of an object to be measured, and which is kept at a predetermined distance from the surface of the object to be measured by means of a control piston which is urged on the measurement nozzle side by the pressure medium feeding said nozzle and, on the opposite side by a reference pressure, wherein the control piston is located in a cylinder the length of which is such as to enable the control piston to transfer the measuring nozzle to a resting position and conversely, means being provided for transferring the measuring device with the control piston.

The transfer of the measuring nozzle from its resting position into the operating or measuring position may be effected by displacing the control piston in the cylinder, suitable dimensioning of the cylinder and certain additional controllable pressure medium connections only being necessary. The measuring device can thus be used for a wide range of purposes, in that all the essential operations can be controlled by a single compact unit which occupies very little space.

Figure 2:
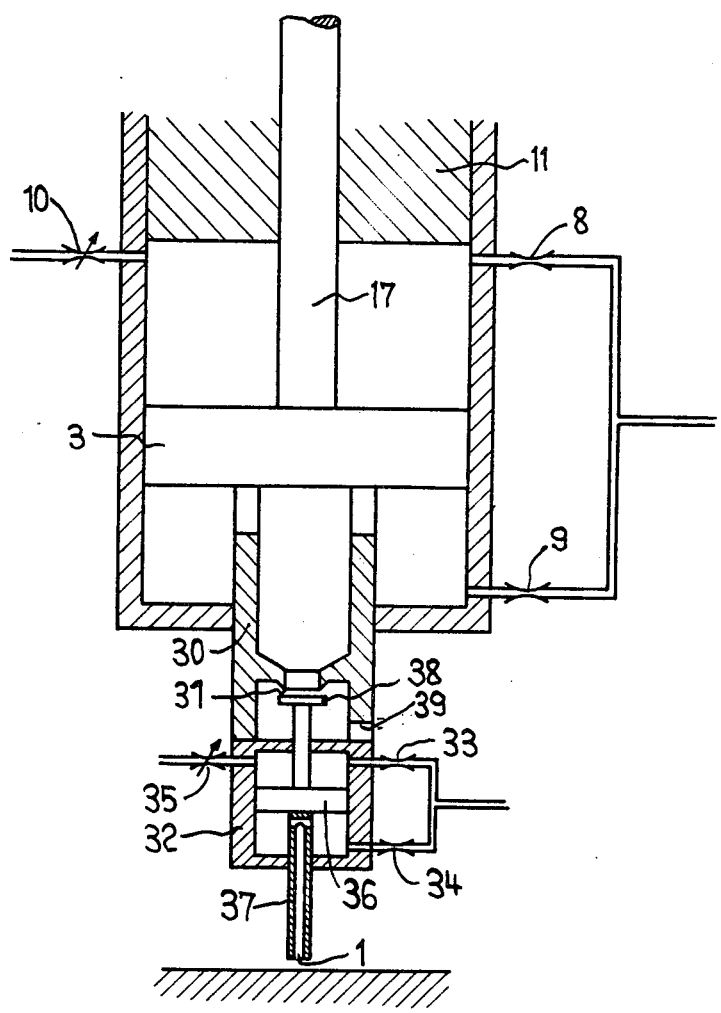
Figure 3:
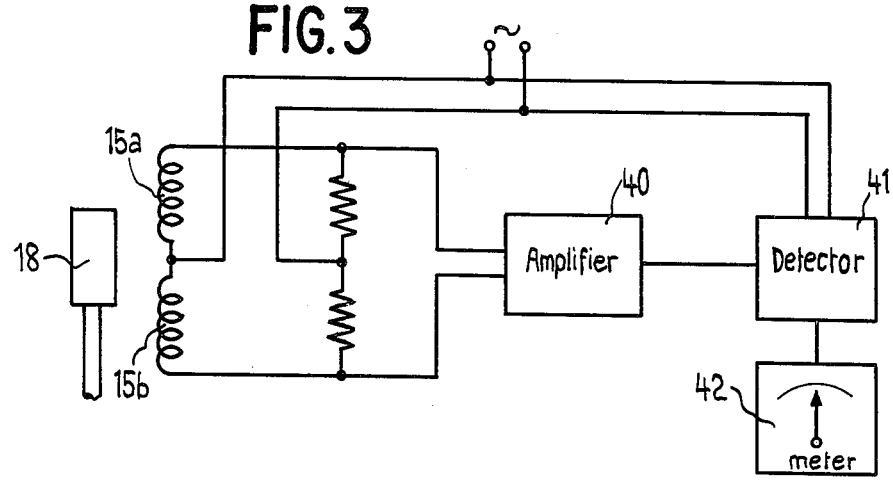
Figure 4:
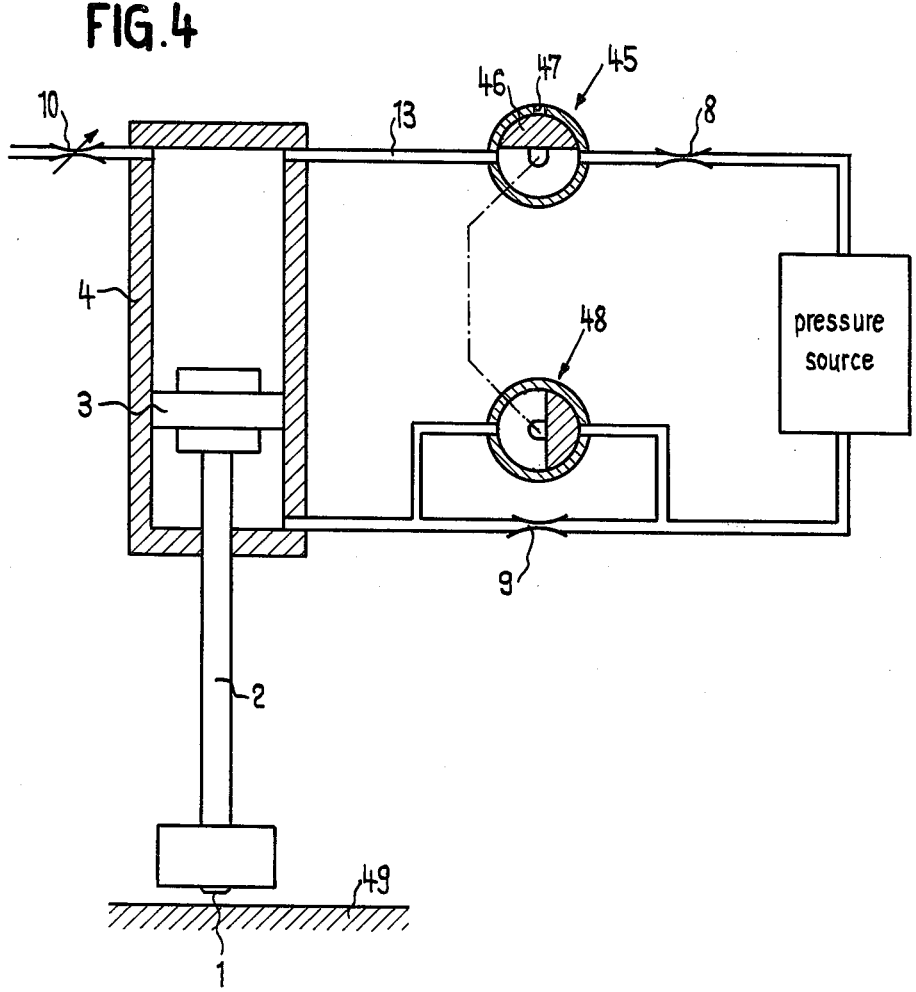

The present invention will be described in greater detail hereinafter with reference to an axial section of an embodiment (FIG. 1) and to a variant of this embodiment (FIG. 2). FIGS. 3 and 4 show an electric and a pneumatic diagram respectively.

The measuring device illustrated in FIG. 1 comprises a measuring nozzle 1 located at the free end of a hollow rod 2. The rod 2 is connected to a control piston 3 axially displaceable in a cylinder 4. The cylinder chamber below the control piston 3 communicates through bores 5 with the bore of the rod 2 and hence with the measurement nozzle 1. Pressure medium inlets 6 and 7, which are fed by way of valves 8 and 9 from a common source of pressure medium, communicate with the cylinder 4 above and below the piston 3, shown in the measuring position. A variable outlet 10 is provided on the cylinder 4 above the control piston 3.

An auxiliary piston 11 having a hollow piston rod 12 passing slidably through the upper end wall of the cylinder, is disposed in the cylinder 4 above the control piston 3. Connected to the end of the cylinder 4 above the auxiliary piston 11, is another pressure medium pipeline 13 controllable in the manner described below.

The piston rod 12 is provided at its end extending out of the cylinder with a sleeve 14 in which the coil assembly 15 of a distance measuring device is secured. A compression spring 16 acts between the sleeve 14, the piston rod 12 and the top of the cylinder 4.

A rod 17 connected to the control piston 3 extends through the bore in the piston rod 12 and carries at its upper end an armature 18 acting on the coil assembly 15. For example, two coils 15a and 15b which are connected in adjacent branches of an alternating current measuring bridge may be provided and are influenced differentially by the armature 18 as shown in FIG. 3. The bridge output is amplified in an amplifier 40 and fed to a phase-controlled demodulator 41. The output of demodulator 41 is indicated by meter 42.

The pistons 3 and 11 are coupled by an axial lost motion coupling, the play thereof being limited by abutment surfaces 19 and 20 on the pistons 3 and 11 respectively, and by abutment surfaces 21 and 22 on the measurement body 18 and the piston rod 12.

The lower end of the rod 2 is provided with a measuring head with a measuring coil 23 surrounding the measuring nozzle. The object of the device in the present case is simultaneously to measure the total thickness, and the thickness of the insulating layer of a metal plate 25 coated with insulating material 24, the plate passing below the measuring nozzle 1 in the direction of the arrow whilst supported accurately in position below the nozzle by a roller 26. The cylinder 4 of the measuring device is secured to a support 27 located in a fixed position with respect to the axis of the roller 26.

As shown in FIG. 1, inlets 6 and 7 are fed through valves of flow resistors 8 and 9 respectively from a low pressure source 43 at a pressure of 1 kp/cm$^2$ for example. Inlet 13 is fed from a high pressure source 44 through a change over valve 45 at a pressure of 6 kp/cm$^2$ for example. Valve 45 is shown in its position admitting pressure air to the upper portion of cylinder 4 for keeping the auxiliary piston 11 in its lower position as shown. The rotatable portion 46 of valve 45 may be rotated in clockwise direction for cutting off pressure from source 44 and for connecting the upper portion of cylinder 4 through an outlet 47 of valve 45 to the ambient atmosphere.

The measuring device is shown in the measuring position, i.e. the measuring nozzle 1 and the measuring coil 23, are brought close to the object 24, 25 to be measured. The control piston 3 is disposed between the inlets 6 and 7 and the measuring piston 11 divides the volume of the cylinder 4 into two approximately equal parts. The cylinder space is therefore limited for the measuring process, a feature which increases the sensitivity and speed of response of the control piston. The lower position of the auxiliary piston 11 which is controlled by means of pressure medium introduced under high pressure through the pipe line 13, is determined by the sleeve 14 striking against the top of the cylinder 4.

The pressure on the top of the control piston 3 is adjusted to a predetermined value by the valve 8 and the variable outlet 10. The pressure under the piston 3 is determined by the flow resistances of the valve 9 and the measuring nozzle 1. A condition of equilibrium is automatically established when the measuring nozzle 1 is at a required space from the surface of the object 24, 25 to be measured, when the piston 3 becomes stationary. If the object to be measured becomes thicker, as indicated on the right of the figure, the pressure on the measuring nozzle increases as a result of the diminishing space, and the piston 3 raises the measuring nozzle so that its space from the object to be measured remains practically constant. The movement of the measuring nozzle is transmitted by the rods 2, 17 to the measuring armature which is displaced correspondingly in the coil assembly 15 so that the position of the measuring nozzle or the total thickness of the object to be measured is indicated by the associated electric circuit.

The thickness of the insulating layer 24 is obtained indirectly by means of the measuring coil 23 on which the metal plate 25 re-acts according to the distance of the coil 23 from the plate as fully disclosed for instance in copending U.S. Pat. application Ser. No. 28,228 in the name of Peter Nopper et al., for since the clearance of the measuring nozzle 1 and, consequently, of the measuring coils 23 above the surface of the insulating layer 24 is constant, the value derived from the measurement coil 23 represents a measurement of the thickness of the layer 24.

If the measuring nozzle with the coil 23 is to be withdrawn for any reason from the object to be measured into a resting position, the supply of pressure medium through the pipe line 13 is interrupted and the upper part of the cylinder chamber connected to atmosphere by means of valve 45 as set out above. Thus raises the auxiliary piston 11 under the action of the pressure below it, assisted by spring 16, until the stop surface 22 strikes against the stop surface 21. The control piston with all the parts connected to it, including the measuring nozzle 1 and the measuring coil 23, is then raised until the auxiliary piston 11 comes into contact with the upper end of the cylinder chamber. The armature 18 is also displaced from its usual measuring position, a feature which is of no importance, since it has not been brought into use. In order to bring the measuring nozzle and the measuring coil 23 back to the measuring position, it is only necessary to supply pressure medium through the pipe line 13 again, which displaces the auxiliary piston 11 downwardly. At the same time it moves the control piston with it until the surface 20 strikes against the surface 19, unless the remanent cushion of air between the two pistons has already effected displacement of both the pistons.

As already mentioned, the auxiliary piston 11 has the advantage that it restricts the cylinder chamber during measurement and thus provides a sensitive measurement means with very little inertia. In addition, it effects a transfer of the measuring device from its operative position into its resting position with very simple control means. However, it would be possible to operate without the auxiliary piston 11. In that case the control piston would have to be in the position illustrated during measurement, and the pipe line 13 would have to be sealed. To transfer to the resting position, the supply of pressure medium must be interrupted by the valve 8, and the pipe line 13 placed in communication with atmosphere. The control piston would now be raised by the pressure medium still fed by way of the valve 9, it must be assumend that sufficient pressure would still be built up under the piston 3 even with the measuring nozzle completely free. To return it to the measuring position, pressure medium would then have to be fed through the pipe line 13, by means of which the control piston would be displaced until it was below the inlet 6 after which it would be controlled by the usual control bridge into the measuring position as shown.

In the case of this embodiment without an auxiliary piston, the inlet and valve 8 could be omitted and the pipe line 13 would then be fed selectively either by way of a valve corresponding to the valve 8 during measurement or for bringing the device to the measuring position, or placed in communication with the atmosphere for transferring the device to the inoperative or retracted position.

An embodiment of this type is schematically shown in FIG. 4, wherein corresponding parts are designated by the same reference numerals as in FIG. 1. Valve 45 is connected between flow resistor 8 and inlet 13, and a valve 48 bridging resistor 9 is added. Valves 45 and 48 are mechanically coupled as indicated. FIG. 4 illustrates the usual measuring position, wherein pressure is admitted to the upper and lower portions of cylinder 4 and piston 3 is maintained in an equilibrium position. For removing nozzle 1 and measuring coil 23 from the measuring object 49, valves 45 and 48 are together rotated by 90° in clockwise direction, whereby the upper end of cylinder 4 is connected to the atmosphere through outlet 47 of valve 45 while full pressure is admitted below piston 3 through valve 48 which is now open. Piston 3 thus moved upwardly by the overpressure acting at its lower side. For returning piston 3 into its measuring position, valves 45 and 47 are returned to the illustrated position.

The measuring coil 23 may be replaced by any other suitable system for carrying out an additional measurement, or this additional measurement may be omitted.

It is not absolutely necessary for the auxiliary piston to have an outwardly projecting piston rod, provided it is suitably connected to the control piston within the cylinder and an end stop is provided for its downward movement. Furthermore, it is also unnecessary for a system of rods, connected to the control piston, to extend through the upper wall of the cylinder, because the distance measuring armature is directly connected to the rod 2.

In certain cases it may be difficult to obtain sufficient control forces with the arrangement of FIG. 1. If the measuring device is to be applied to an object to be checked in various positions in succession, for example, vertically from above and vertically from below, considerable differences in the measured value may result, particularly if transmitting members (18, 23) to be jointly moved have a considerable weight. FIG. 2 shows a variant in which an intensification of control forces is obtained by means of an auxiliary control system. Corresponding parts have the same reference numerals as in FIG. 1. Instead of the rod 2, a tube 30 is secured to the piston 3. This tube is provided with a transverse wall in which an opening is provided, the lower edge 31 of which forms a valve seat. The lower end of the tube 30 is connected to an auxiliary cylinder 32 having pressure medium inlets with valves 33 and 34 corresponding to the valves 8 and 9, and an adjustable outlet valve 35. In the cylinder 32 there is a control piston 36 provided at the bottom with a rod 37, corresponding to the rod of FIG. 1, with a measuring nozzle 1. The piston 36 also carries a piston rod extending sealingly upwardly through the cover of the cylinder 32, with a valve plate 38 co-operating with a valve seat 31. The tube 30 has an outlet opening 39 above the cylinder 32.

The mode of operation of the variant shown in FIG. 2 will be readily understood from that which has been described above. The piston 36 of the auxiliary cylinder is displaced upwardly or downwardly, according to whether the measuring nozzle 1 is too close to or too remote from the object to be measured. When the piston 36 rises, the flow of pressure medium is throttled at the valve 31, 38, the pressure under the piston 3 rises and this piston rises. If the piston 36 moves downwardly, the reverse effect occurs. This achieves an intensification of the control effect in order to surmount the possible deficiencies of a single-stage system. The operating pressure for the auxiliary cylinder is preferably selected to be lower than that in the main cylinder.

The measuring coil 23 is not shown in FIG. 2, but a metering device of any suitable type may be connected to the rod 37.

As already mentioned, an advantage of both embodiments resides in the feature that the stroke of the cylinder is small during measurement, a feature which permits accurate control with very little inertial force. This advantage is also maintained if the displacement of the auxiliary piston 11 and the control piston 3 with the rods 2, 17 or 17 30, 37 is effected by other means, e.g. by a separate cylinder or by an electromagnet, or directly by mechanical means in order to effect the transfer from the resting to the measuring position and conversely. However, it is usually preferable to use the already existing cylinder 4 for both the control of the piston 3 during measurement and the withdrawal of the measuring system between measurements.

What is claimed is:

1. A measuring device incorporating a measuring nozzle through which a pressure medium is conveyed against the surface of an object to be measured, and another non-pneumatic measuring feeler displaceable together with said nozzle, said nozzle and measuring feeler being kept at a predetermined distance from the surface of the object to be measured by means of a control piston which is urged on the measurement nozzle side by the pressure medium feeding said nozzle and, on the opposite side by a reference pressure, wherein the control piston is located in a cylinder the length of which is such as to enable the control piston to transfer the measuring nozzle to a resting position and conversely, valve means being provided for control of the pressure condition within said cylinder and for thereby transferring the measuring device by the control piston.

2. A measuring device incorporating a measuring nozzle through which a pressure medium is conveyed against the surface of an object to be measured, and which is kept at a predetermined distance from the surface of the object to be measured by means of a control piston which is urged on the measurement nozzle side by the pressure medium feeding said nozzle and, on the opposite side by a reference pressure, wherein the control piston is located in a cylinder the length of which is such as to enable the control piston to transfer the measuring nozzle to a resting position and conversely, valve means for controlling pressure conditions within said cylinder and for thereby transferring the measuring device by the control piston, an auxiliary piston located in the cylinder on the side of the control piston remote from the measuring nozzle, said auxiliary piston being advanced towards the control piston when the control piston and measuring nozzle are in the measuring position.

3. A device according to claim 2, wherein a controllable pressure medium inlet is located between the auxiliary piston and the end of the cylinder adjacent thereto.

4. A device according to claim 2 wherein the control piston and auxiliary piston are connected by a lost motion coupling, the transfer of the control piston being at least partially effected by the auxiliary piston.

5. A device according to claim 2, wherein the auxiliary piston is drilled through out and a system of rods connecting the measurement nozzle, the control piston and a distance recorder extends slidably through the auxiliary piston and the two end walls of the cylinder.

6. A device according to claim 5, wherein the auxiliary piston has a hollow piston rod which extends slidably through the end wall of the cylinder and in contact with the auxiliary piston, and has a stop acting on the rods.

7. A device according to claim 6 wherein the piston rod carries a part of the distance recorder.

8. A device according to claim 6 wherein the piston rod is biased by a spring tending to transfer the piston to the resting position.

* * * * *